(12) United States Patent
Bly

(10) Patent No.: US 7,145,739 B1
(45) Date of Patent: Dec. 5, 2006

(54) LIGHTWEIGHT OPTICAL MIRRORS FORMED IN SINGLE CRYSTAL SUBSTRATE

(75) Inventor: Vincent T. Bly, Springfield, VA (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 212 days.

(21) Appl. No.: 10/385,166

(22) Filed: Mar. 6, 2003

Related U.S. Application Data

(60) Provisional application No. 60/362,574, filed on Mar. 7, 2002.

(51) Int. Cl.
G02B 5/08 (2006.01)
G02B 1/02 (2006.01)

(52) U.S. Cl. .................................. 359/900; 359/838

(58) Field of Classification Search ............... 359/838, 359/839, 900; 438/455–459; 117/84–98
See application file for complete search history.

(56) References Cited

U.S. PATENT DOCUMENTS

| | | | |
|---|---|---|---|
| 3,514,275 A * | 5/1970 | Bray | 65/33.5 |
| 3,713,728 A * | 1/1973 | Austin et al. | 359/848 |
| 3,753,322 A | 8/1973 | Bordes | |
| 4,657,358 A | 4/1987 | Anthony et al. | |
| 4,678,293 A * | 7/1987 | Paseri | 359/848 |
| 4,885,055 A | 12/1989 | Woodbury et al. | |
| 4,989,226 A | 1/1991 | Woodbury et al. | |
| 5,022,745 A | 6/1991 | Zayhowski et al. | |
| 5,230,182 A | 7/1993 | Daniell et al. | |
| 5,505,805 A * | 4/1996 | Papenburg et al. | 156/155 |
| 5,565,052 A * | 10/1996 | Papenburg et al. | 156/155 |
| 5,609,511 A * | 3/1997 | Moriyama et al. | 451/5 |
| 5,719,846 A | 2/1998 | Matoba et al. | |
| 5,882,401 A * | 3/1999 | Maruyama et al. | 117/97 |
| 6,108,121 A | 8/2000 | Mansell et al. | |
| 6,165,873 A * | 12/2000 | Hamada | 438/459 |
| 6,426,968 B1 * | 7/2002 | Strife et al. | 372/99 |
| 2001/0028518 A1 | 10/2001 | Kaiser | |
| 2002/0043081 A1 * | 4/2002 | Bowden et al. | 65/61 |

FOREIGN PATENT DOCUMENTS

JP 05157903 6/1993
JP 8201593 A 8/1996

* cited by examiner

Primary Examiner—Mark A. Robinson
(74) Attorney, Agent, or Firm—Christopher H. Kirkman

(57) ABSTRACT

This invention is directed to a process for manufacturing a lightweight mirror from a single crystal material, such as single crystal silicon. As a near perfect single crystal material, single crystal silicon has much lower internal stress than a conventional material. This means much less distortion of the optical surface during the light weighting process. After being ground and polished, a single crystal silicon mirror is light weighted by removing material from the back side using ultrasonic machining. After the light weighting process, the single crystal silicon mirror may be used as-is or further figured by conventional polishing or ion milling, depending on the application and the operating wavelength.

17 Claims, 2 Drawing Sheets

SECTION A–A

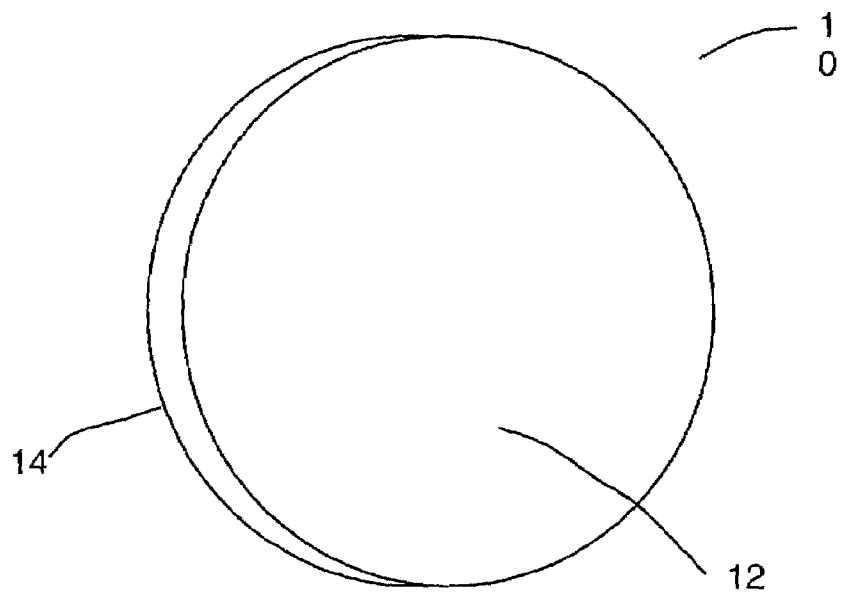
FIG. 1 (a)
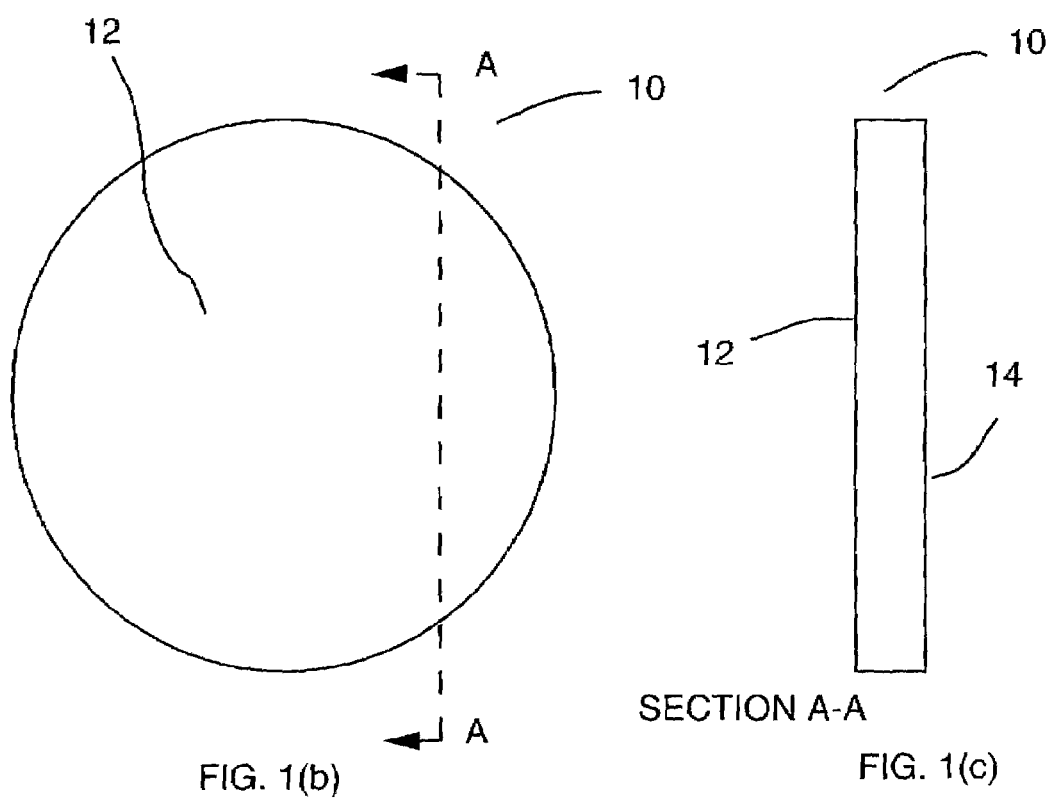
FIG. 1(b)
SECTION A-A
FIG. 1(c)

SECTION A-A

LIGHTWEIGHT OPTICAL MIRRORS FORMED IN SINGLE CRYSTAL SUBSTRATE

CROSS-REFERENCES TO RELATED APPLICATIONS

This application now formalizes and incorporates herein by reference Provisional Application Ser. No. 60/362,574, "Light Weight Optical Mirrors Formed in Single Crystal Silicon," Vincent Bly, filed on Mar. 7, 2002. Applicant claims the priority date thereof under 35 U.S.C. 119(e).

ORIGINS OF THE INVENTION

The invention described herein was made by employees of the United States Government. The invention may be manufactured and used by or for the governmental purposes without the payment of royalties thereon or therefor.

FIELD OF THE INVENTION

The present invention relates to a process for manufacturing lightweight optical parts from a single crystal blank.

BACKGROUND OF THE INVENTION

Lightweight mirrors are needed for a wide variety of applications, especially in the space and aeronautic industries where overall system weight reduction and precision of optical parts are critical. Using a light weighting process, the mass of a mirror may be reduced by up to 90% compared to a solid blank of the same size and material.

One method for fabricating a lightweight mirror involves creating a lightweight mirror blank consisting of a face sheet and a lightweight support structure such as a low-density honeycomb structure.

When the lightweight blank is optically ground and polished, the local variation in stiffness due to the light weighted structure can cause "quilting" or "print-through". This is caused by a variation in deflection of the surface based on the pattern of the reinforcing ribs. In other words, the variation in deflection causes a proportional variation in material removal rate creating the quilt-like pattern.

The problem above is usually avoided by making the face sheet thicker. However, this solution adds more mass to the mirror. The problem can also be avoided by grinding and polishing a solid blank and light weighting afterward as described in U.S. Pat. No. 3,753,322 ('332).

Another method claimed by the patent '322 comprises forming at least one optical surface on a solid blank by machining and mechanical polishing, ultrasonically machining cavities underlying the optical face in at least one of the remaining faces of the blank to reduce the weight of the article. The patent '332 also discloses that the optical surface so lightened is to be coated by high-temperature, vacuum-evaporation deposition of aluminum.

The drawbacks of the method disclosed in '332 is that the optical surface still suffers greatly from distortion during the light weighting process. Virtually any polycrystalline or vitreous material, no matter how well annealed, will have some residual internal stress. During the light weighting process, as stressed material is removed, the remaining material distorts, ruining the optical surface.

SUMMARY OF THE INVENTION

The present invention is directed to a novel process for fabricating lightweight optical mirrors from a single crystal material, such as single crystal silicon. The process is based on grinding and polishing the solid mirror blank before light weighting. This avoids "print-through" and other effects caused by working on the light weighted optical blank. The very low internal stress in a single crystal material, allows light weighting with minimal distortion of the optical surface. The mirror is hollowed out from a non-optical surface via ultrasonic machining. After light weighting, the mirror may be used as-is or further figured by conventional polishing or ion milling, depending on the application and the operating wavelength. Final polishing of the lightweight mirror does not produce significant print-through because of the small amounts of the material removed.

DESCRIPTION OF DRAWINGS

FIGS. 1(a)–(c) are perspective, back, and side views of a substrate from which a lightweight mirror is made.

DETAILED DESCRIPTION OF PREFERRED EMBODIMENTS OF THE INVENTION

Figure 2B:
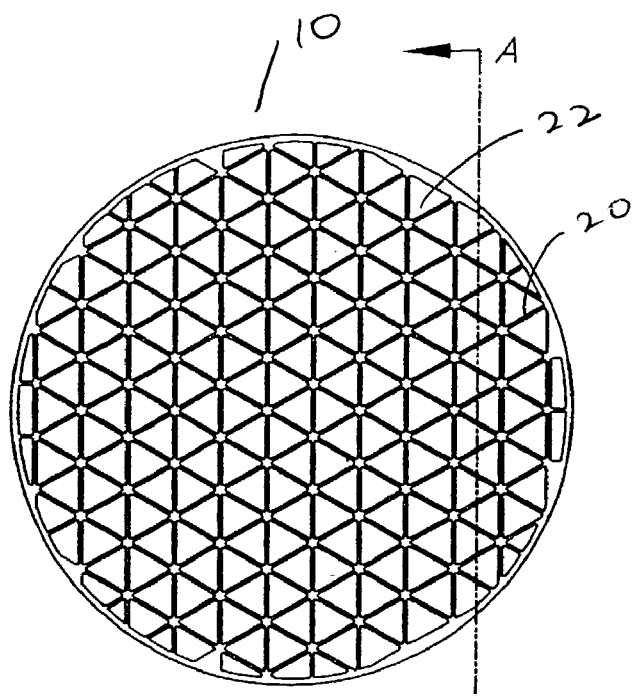
FIGS. 2(a)–(c) are perspective, back, and sectional along line A—A views of a lightweight mirror made via the present invention.

The process of the present invention is based on grinding and polishing an optical surface of a solid mirror blank—before light weighting—using a single crystal material. The invention uses single crystal for the following reasons: unlike vitreous or polycrystalline materials, single crystal materials do not have residual internal stresses. This means, in principle, that material can be removed from the back of a completed single crystal mirror without degrading its optical figure; single crystal silicon is an excellent material for high quality optics because it is easily polished; and single crystal silicon also has high thermal conductivity and low thermal expansion.

FIGS. 1(a)–(c) show a solid blank substrate 10 from which a lightweight mirror is to be made. The process begins with a substrate 10 of single crystal silicon. To produce a mirror, this substrate is ground and polished and given its near-finished or finished optical surface while it is still a robust solid blank. This avoids the "print-through" created when a lightweighted blank is optically ground and polished, as described before.

After being ground and polished on one side 14, the mirror 10 is lightweighted by removing material from the backside 12 using ultrasonic machining. That is, weight-reducing recesses 22 are made in the face 12, opposite the optical surface 14 and structural elements 20 are produced. Alternately, depending upon the desired structure, lightweighting may be accomplished by removing material from the periphery rather than the backside 12. U.S. Pat. Nos. 5,230,182 and 3,753,322 disclose such ultrasonic machining of optic materials and are hereby incorporated by reference.

Figure 2C:
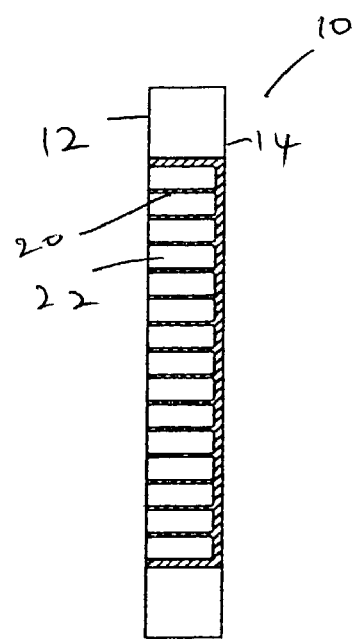
Figure 2A:
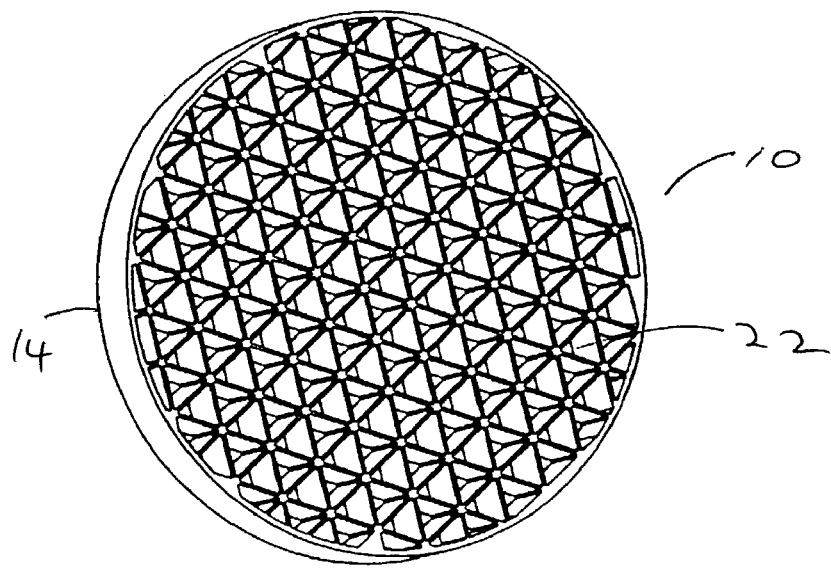

FIGS. 2(a)–(c) show a final product of a lightweight mirror. Other lightweight structures may be fabricated based on the desired support configuration.

After light weighting, the mirror 10 may be used as-is or further figured by conventional polishing or ion milling, depending on the application and the operating wavelength. Experiments to date indicate that a small distortion is introduced by the lightweighting process on the order of ¼ wave of visible light. This distortion may be introduced when approximately 75% of the material is removed. For most infrared applications, this is acceptable. For visible or ultra-violet applications, some further optical figuring may be needed. As noted above, final figuring via conventional polishing is a viable alternative. Although the same dynamic applies here as when grinding and polishing an already light weighted blank, the amount of material removed is much less, typically by 20 times or more. Therefore the resulting print-through is reduced by the same factor. In practice, this means that the print-through produced by conventional final polishing is not significant.

The following is a step-by-step example of how the novel process might be implemented to fabricate a 4 inch diameter, concave curved surface, lightweight mirror of very high quality.

A 4.0 inch diameter by 0.6 inch thick cylindrical mirror blank is cut from a single crystal silicon boule.

A 4.0 inch diameter by 0.6 inch thick cylindrical Pyrex "protector" is also made. The function of this protector will be explained in a later step.

A standard curve generator is used to grind the near net shape (a concave curve in this case) in the silicon mirror blank.

A standard curve generator is also used to grind a complementary convex surface in the Pyrex protector.

The mirror blank is next heated to near the melting point of the silicon and kept at temperature for an extended period of time (typically many hours). The blank is then slowly cooled back to room temperature. The purpose of this step is to heal crystalline defects created during the sawing and grinding used to create the near net shape blank and is well-known in the art.

The near net shape silicon blank is ground and polished, using conventional abrasives and procedures, to an optical figure good to $1/8^{th}$ wavelength of visible light, peak-to-valley.

Hot wax is then poured onto the optical surface of the silicon mirror. While the wax is still hot, the Pyrex protector is placed on the wax and adjusted so that the protector and mirror are concentric and the wax bond is uniform in thickness. Note: Pyrex was chosen because it is inexpensive, readily available, and closely matches the thermal expansion of silicon.

With the mirror's optical surface protected, material is removed from the back side of the mirror via ultrasonic machining. Material is removed in a two-dimensional array of triangular depressions, forming an isogrid pattern of supporting ribs. Enough material is removed by this process to reduce the weight of the mirror to $1/4^{th}$ that of a standard quartz mirror of the same diameter.

The mirror and protector are placed in an oven and heated to melt the bonding wax. The mirror is separated from the protector and any remaining wax on the mirror is removed with solvent.

The optical figure of the mirror is re-measured to verify that it is within one-half ($1/2$) wave or better of the required final surface.

The mirror surface is next re-polished, using standard techniques and equipment, until the optical surface meets the required figure to $1/10^{th}$ wavelength of visible light, or better.

The lightweighting steps shown above can be implemented on a single crystal substrate of any size. For lightweighting purposes the minimum size of the substrate would be approximately one inch while the current maximum size available for single crystal silicon is approximately sixteen inches. The idea of fabricating lightweight mirrors is based on combining ultrasonic machining and conventional polishing along with the newly adopted optical material to accomplish a significant improvement in quality of lightweight mirrors.

This invention adapts single crystal silicon, which does not have internal stress in the conventional sense of the word. Moreover, silicon is presently available as a near perfect single crystal material and in sizes large enough for most instrument applications. Also, other properties of silicon are ideally suited for optical mirrors. The distortion caused by the light weighting process on mirrors is many times smaller than any previous effort.

Another aspect of the present invention is that conventional polishing may be performed on the lightweighted mirror without producing print-through due to the fact that very small amounts of material is removed by the polishing process. This post polishing step of the lightweighted mirror is not apparent to others skilled in the art. The polishing and lightweighting process described above produces a very high quality optical mirror.

The technical details as to how the present invention avoids print-through follows. As noted before, print-through is the imprint of the reinforcing rib pattern on the optical figure. If the mirror is ground and polished from a solid blank, before lightweighting, the ribs are not yet present, thus print-through is avoided.

As the residual distortion in the mirror after the lightweighting process is small, it is only necessary to remove a very small amount of material in order to perfect the mirror figure. Since this is typically more than twenty times smaller than the amount of material removed to form the original optical figure, the print-through is reduced by the same amount.

For the present invention, print-through is substantially negligible. It is important to note that the magnitude of the lightweighting on these test mirrors is so large that print-through would have been totally unacceptable had the mirrors been processed in the conventional way.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A process for manufacturing a lightweight optical mirror from a single crystal substrate, which process comprises:
    providing a single crystal substrate;
    polising a first surface of the substrate to produce a polished surface having a predetermined optical figure; and
    removing substrate material from a second surface of the substrate after polishing the frist surface of the substrate to the predetermined optical figure for the purpose of reducing weight of the substrate, wherein the step of removing introduces distortion on the order of $1/4$ (one-quarter) wavelength of visible light when approximately 75% (seventy five-percent) of the material is removed.

2. The process of claim 1, wherein the single crystal substrate is single crystal silicon.

3. The process of claim 1, wherein the step of removing material is effected by ultrasonic machining.

4. The process of claim 1, wherein the predetermined optical figure is on the order of ⅛ (one-eighth) wavelength of visible light.

5. The process of claim 1, wherein after the step of removing material, print-through on the polished surface is substantially negligible.

6. The process of claim 1, wherein the single crystal substrate has a diameter of at least one inch.

7. The process of claim 1, wherein the single crystal substrate has a diameter is between approximately one inch and approximately sixteen inches.

8. The process of claim 1, further comprising:
post-polishing the polished surface, the post-polishing step being performed after the removing step.

9. The process of claim 8, wherein the step of post-polishing produces a final optical figure of at least the order of 1/10 wavelength of visible light.

10. A lightweight optical mirror manufactured in accordance with the process of claim 1.

11. A process for manufacturing a mirror, comprising:
providing a single crystal substrate;
polishing a first surface of the substrate to a predetermined optical figure; and
forming at least one recess in a second surface of the substrate to produce structural elements, wherein forming at least one recess comprises:
grinding a protective element to a shape complementary to the near net shape of the first surface;
grinding a protective element to a shape complementary to the near net shape of the first surface;
coating the first surface having the predetermined optical figure;
engaging the protective element with the coated first surface; and
removing material from the second surface.

12. The process of claim 11, wherein polishing the first surface of the substrate further comprises:
heating the substrate to a temperature near its melting point;
cooling the substrate to room temperature; and
polishing the first surface to the predetermined optical figure.

13. The process of claim 11, wherein the first surface having the predetermined optical figure is coated with wax.

14. The process of claim 11, wherein the structural elements comprise supporting ribs.

15. The process of claim 11, wherein the second surface of the substrate is a substantially planar surface opposite to the first surface.

16. The process of claim 11, wherein the second surface of the substrate is a peripheral surface adjacent to the first surface.

17. The process of claim 11, further comprising post-polishing the first surface to the predetermined optical figure with an accuracy of at least 1/10 wavelength of visible light.

* * * * *

UNITED STATES PATENT AND TRADEMARK OFFICE
CERTIFICATE OF CORRECTION

PATENT NO. : 7,145,739 B1
APPLICATION NO. : 10/385166
DATED : December 5, 2006
INVENTOR(S) : Vincent T. Bly It is certified that error appears in the above-identified patent and that said Letters Patent is hereby corrected as shown below:

Column 4, line 53, "polising" should read --polishing--.

Column 4, line 57, "frist" should read --first--.

Column 5, line 23, after "figure", insert --, wherein polishing the first surface comprises grinding the first surface to a near net shape--.

Column 5, line 29, delete "grinding a protective element to a shape complementary".

Column 5, line 30, delete "to the near net shape of the first surface;".

Signed and Sealed this

Thirteenth Day of February, 2007

JON W. DUDAS
*Director of the United States Patent and Trademark Office*